United States Patent
Pfeifer et al.

(10) Patent No.: US 10,150,093 B2
(45) Date of Patent: Dec. 11, 2018

(54) MICROSTRUCTURE REACTOR FOR CARRYING OUT EXOTHERMIC HETEROGENOUSLY-CATALYSED REACTIONS WITH EFFICIENT EVAPORATIVE COOLING

(71) Applicant: KARLSRUHER INSTITUT FUER TECHNOLOGIE, Karlsruhe (DE)

(72) Inventors: Peter Pfeifer, Linkenheim (DE); Paolo Piermartini, Karlsruhe (DE); Achim Wenka, Remchingen (DE)

(73) Assignee: INERATEC GMBH, Karlsruhe (DE)

( * ) Notice: Subject to any disclaimer, the term of this patent is extended or adjusted under 35 U.S.C. 154(b) by 0 days.

(21) Appl. No.: 15/743,765

(22) PCT Filed: Jul. 15, 2016

(86) PCT No.: PCT/EP2016/066869
§ 371 (c)(1),
(2) Date: Jan. 11, 2018

(87) PCT Pub. No.: WO2017/013003
PCT Pub. Date: Jan. 26, 2017

(65) Prior Publication Data
US 2018/0207607 A1    Jul. 26, 2018

(30) Foreign Application Priority Data
Jul. 17, 2015 (DE) .................. 10 2015 111 614

(51) Int. Cl.
*B01J 19/00* (2006.01)
*B01J 19/24* (2006.01)
*F28D 21/00* (2006.01)

(52) U.S. Cl.
CPC ......... *B01J 19/0093* (2013.01); *B01J 19/249* (2013.01); *B01J 2219/0086* (2013.01); *B01J 2219/00783* (2013.01); *B01J 2219/00835* (2013.01); *B01J 2219/00869* (2013.01); *B01J 2219/00873* (2013.01);
(Continued)

(58) Field of Classification Search
CPC ............... B01J 19/0093; B01J 19/249; B01J 2219/2451; B01J 2219/00869; B01J 2219/2464; B01J 2219/246; B01J 2219/2453; B01J 2219/00896; B01J 2219/00873; B01J 2219/2462; B01J 2219/0086; B01J 2219/00835; B01J 2219/00783; B01J 2219/2481;
(Continued)

(56) References Cited

U.S. PATENT DOCUMENTS 6,537,506 B1    3/2003  Schwalbe
6,622,519 B1    9/2003  Mathias
(Continued)

FOREIGN PATENT DOCUMENTS

DE      10044526 A1    4/2002
DE    102005022958 B3    7/2006
(Continued)

*Primary Examiner* — Lessanework Seifu
(74) *Attorney, Agent, or Firm* — Abel Law Group, LLP

(57) ABSTRACT

The invention relates to a micro-reactor for carrying out at least one catalytic reaction between two or more reactants in each case, comprising a stacking sequence of reaction surfaces (1) for carrying out at least one exothermic reaction, and a cooling region (6) divided at least into individual fields (6) with feed and discharge devices for the coolant.

15 Claims, 4 Drawing Sheets

(52) U.S. Cl.
CPC ............... *B01J 2219/00894* (2013.01); *B01J 2219/00896* (2013.01); *B01J 2219/246* (2013.01); *B01J 2219/2451* (2013.01); *B01J 2219/2453* (2013.01); *B01J 2219/2462* (2013.01); *B01J 2219/2464* (2013.01); *B01J 2219/2481* (2013.01); *B01J 2219/2497* (2013.01); *F28D 2021/0022* (2013.01); *F28F 2260/00* (2013.01)

(58) Field of Classification Search
CPC ...... B01J 2219/2497; B01J 2219/00894; F28F 260/00; F28D 2021/0022
See application file for complete search history.

(56) References Cited

U.S. PATENT DOCUMENTS

| | | |
|---|---|---|
| 6,994,829 B2 | 2/2006 | Whyatt |
| 7,014,835 B2 | 3/2006 | Mathias |
| 7,084,180 B2 | 8/2006 | Wang |
| 7,404,936 B2 | 7/2008 | Mazanec |
| 7,422,910 B2 | 9/2008 | Fitzgerald |
| 8,747,805 B2 | 6/2014 | Tonkovich |
| 8,802,039 B2 | 8/2014 | Neagle |
| 2005/0141843 A1 | 6/2005 | Warden |

FOREIGN PATENT DOCUMENTS

| | | |
|---|---|---|
| EP | 1038575 A2 | 9/2000 |
| EP | 1123734 A2 | 8/2001 |
| WO | 2004017008 A1 | 2/2004 |
| WO | 2004037418 A2 | 5/2004 |
| WO | 2005044442 A1 | 5/2005 |
| WO | 2005065387 A2 | 7/2005 |
| WO | 2005075606 A1 | 8/2005 |
| WO | 2005082519 A1 | 9/2005 |
| WO | 2011075746 A2 | 6/2011 |
| WO | 2011134630 A1 | 11/2011 |
| WO | 2012054445 A2 | 4/2012 |
| WO | 2012104058 A1 | 8/2012 |

MICROSTRUCTURE REACTOR FOR CARRYING OUT EXOTHERMIC HETEROGENOUSLY-CATALYSED REACTIONS WITH EFFICIENT EVAPORATIVE COOLING

BACKGROUND OF INVENTION

1. Field of the Invention

The invention relates to a microstructure reactor for carrying out catalytic reactions.

2. Discussion of Background Information

Microstructure reactors have already been implemented in various embodiments and are already being used commercially in a micro-process technique for certain applications. They are designed with special consideration of microtechnological boundary conditions. A microstructure reactor comprises at least, but not exclusively, a reaction zone with at least one inflow and at least one outflow. Controlled reactions take place in the reaction zones, whereby a catalyst is used in at least one reaction zone. An embodiment is also possible without catalyst. As a basic principle the reaction zones can be designed as mixing wells or as continuous-flow wells with merging of fluids and/or branching.

Usually a distinction is made between simple cross-flow and counter-flow or cocurrent-flow processes. In many cases there is a cross-flow-like share. If coolants are used that do not pass through a phase change, the result is an uneven capacity for the cooling of the different reaction channels within a plate of the overall system. The number of reaction channels passed over is different for each cooling channel. The rise in temperature leads to a higher temperature emerging in the cooling channel underneath. Owing to the exponential increase in the reaction rate of the chemical reaction with the temperature in the particular reaction channel this leads to an additional discrepancy between the cooling capacity of the coolant and the ability of the reaction to evolve heat. Moreover, the viscosity of the fluids changes, which again leads to an uneven distribution of the media over the individual channels and on both the cooling plate and the reaction plate, which is also undesirable. In this connection the uneven distribution of the reaction medium is a challenge, because this automatically means a different residence time.

In the case of evaporative cooling the facts are even more complicated. Just as when coolants are used that remain in a single phase, the heat to be removed changes along the reaction channel. In respect of an at least partially present cross-flow arrangement this means a different degree of evaporation. This is undesirable with regard to the use of the generated steam for other subsystems in an overall process for increasing the efficiency of the overall process chain. This even distribution is additionally influenced negatively with regard to the achievable overall degree of steam of the coolant. Thus, steam is evolved first over areas in which the reaction progresses more quickly. The increase in the speed of the coolant that occurs there leads to a reduction in the throughput of the specific cooling channel through communication regarding the pressure in the overall system and thus reinforces the effect of the different degree of evaporation of the coolant between the channels of a plate. In addition temperature control of the reaction is made more difficult. The reaction channels over which pure steam passes can no longer be cooled adequately, because the mass flow and the specific heat capacity of the steam are considerably smaller.

Furthermore, the generally usual area and volume requirement of the catalytic reaction (>90% of all cases) is considerably greater than the channel surface that is required, in order to carry away the heat of reaction. That means the plane with cooling channels is usually severely oversized. In other words, the possible heat-transfer coefficient is higher than required, depending on one's point of view. Moreover, the calculable heat flow per pair of plates consisting of reaction and cooling is greater than the enthalpy of reaction to be transferred. This fact can additionally reinforce the effect of the locally uneven evaporation transversely to the row of the reaction channels. This is because the evaporation of the coolant can occur earlier and be completed ahead of time. In extreme cases the evaporation procedure can take place before the actual cooling channels and the distribution of the coolant in the longitudinal direction of the reaction channels can be made more difficult. Because the reaction channels are frequently oriented vertically, this means implicitly that the distribution to the cooling channels likewise takes place vertically and is influenced by gravitation. Thus, finally access to certain regions can be prevented by bubble formation in front of the cooling channels.

There are a few solutions in the prior art for solving the problems highlighted. In WO 002004017008 flow control with phase change in microchannels is described. WO 002004037418 describes the cross-flow type of construction with filling of catalysts, whereby the catalyst is graded, in order to control the heat produced. The possibility of distribution in channel structures through the influencing of pressure is known from WO 002005044442. In WO 002005075606 the process of Fischer-Tropsch synthesis with co-catalysts in microreactors (>25% cobalt loading) is presented. The document relates moreover to the possibility of using different numbers of channels along the reaction zone to cool the reaction. The possibility of temperature gradation with different coolant is known in turn from WO 002005082519. The content of WO 002005065387 is the possibility, in principle, of using a reaction zone for evaporation. The necessary measures to prevent too much deformation in respect of the slot-shaped design of microchannels through reinforcement of the side walls emerge from WO 002011075746. The distribution of reactant gas in the coolant with partial cross-flow arrangement, partial addition of reactants and heat exchange very generally are presented from WO 002012054455 and WO 2011134630. Finally, U.S. Pat. No. 6,994,829 describes the use of (tortuous) small channels for evaporation paired with subsequent superheating in straight, larger channels. The coupling of two reactions is known from U.S. Pat. No. 7,014,835 and DE 10044526. The use of the column structure for multi-phase reactions with the feed of reactants emerges from DE 102005022958. A presentation of the sequential carrying-out of catalytic reactions with intermediate cooling exists in DE 10201210344.

In none of these documents is there a description of the necessary measure in cross-flow-type arrangements for effective distribution of coolant that is to be evaporated completely, but not necessarily superheated. The partial addition is used for reactions and graduated catalyst beds/cooling zones are proposed for better cooling.

Accordingly, the object of the present invention is to remedy the problems described. More particularly the challenge of achieving an even temperature throughout the reactor as a whole by means of parallelised distribution structures remains in place.

SUMMARY OF THE INVENTION

This object is achieved by means of a microstructure reactor for carrying out an exothermic reaction between two or more reactants, which are passed in the form of fluids over one or more catalyst(s), comprising at least a stacking sequence of
  a) at least one layer having one or more catalyst(s) for carrying out at least one exothermic reaction,
  b) at least one layer divided into two or more cooling fields,
  c) at least one layer having distributor structures
     with lines for distribution of the coolant,
     with connections for the feed of coolant to the lines of the distributor structure and for connection to the cooling fields,
     connections for the discharge of the heated coolant from the cooling fields and
     lines and connections for the discharge of the heated coolant from the stacking sequence.

According to the invention there is therefore at least one stacking sequence. Accordingly, the microstructure reactor can have any desired numbers of stacking sequences. The stacking sequences are preferably arranged as mirror images of each other. In this connection the individual layers can be configured in the form of plates or in the form of films.

The thicknesses of the individual layers can preferably be within the following ranges:
layer a) 0.5 mm to 10 mm, preferably 1 mm to 3 mm
layer b) 0.1 mm to 5 mm, preferably 0.3 mm to 0.6 mm
layer c) 1 mm to 10 mm, preferably 1 mm to 3 mm According to the invention one or more layers can have structures on their surfaces. The structures arranged in layer a) serve to accommodate the catalysts. These structures can therefore be reaction channels or also what are known as reaction slots, which are filled with particles of the catalyst material or coated with catalyst. The height of the reaction channels can be between 0.4 mm and 8 mm, preferably 0.8 mm and 1.5 mm.

According to the invention preferably cobalt, iron, nickel, rhodium or ruthenium should be considered as catalysts. Compounds containing these elements can also be used. Equally combinations of one or more of the named elements are possible. Equally the named catalysts can be used with further unnamed suitable catalysts known to the skilled person.

According to the invention the catalysts serve to carry out reactions. These are, according to the invention, exothermic reactions. For these, preferably, fluids containing the reactants or consisting thereof are passed over the catalyst-containing surfaces. These can be gaseous or liquid fluids containing the relevant reactants or consisting thereof. With them a reaction area forms over the catalysts, where the fluids are converted. With regard to the fluids used according to the invention for example synthesis gases, hydrogen/oxygen and hydrocarbons such as methane, alkenes etc., can be used. Two or more of the named fluids can be combined at will.

An application example is the Fischer-Tropsch reaction. Here, from synthesis gas (a mixture of carbon monoxide and hydrogen gas) a plurality of liquids consisting predominantly of alkanes of different chain length is formed, which are converted by way of appropriate refining steps into diesel or kerosene-containing synthetic fuels. During the conversion olefins and isomers may also form. The alkanes can be present in liquid or gaseous form. The relevant reaction is strongly exothermic and can be carried out in the present microstructure reactor.

The stacking sequence according to the invention contains cooling fields as layer b). That means that one or more cooling fields are arranged in this layer. The heat arising in the reaction surface is absorbed by these cooling fields. The individual fields have equal cooling properties or have the same cooling capacity in relation to each other. Thus, an even cooling of the entire reaction region is achieved. Each field along a specific supply channel and/or the distributor structure is supplied according to the invention with almost the same quantity of coolant at almost the same temperature.

The cooling fields can have various structures. What is essential is that the channels for the coolant that has been heated or transformed into the vapour form are bent, i.e. have at least one bend. In this way the weight has little influence on the flow and any ejection of liquid drops is avoided. In the cooling fields the coolant runs in a ring-like and/or wave-like form (layer (2)) and is then discharged again via the distributor structure (layer (3)).

The coolant used according to the invention is preferably liquid. In the simplest case it is water. Apart from that other coolants are also usable. Examples are ammonia, butane, glycol, fluorochlorinated hydrocarbons and propane. All other coolants known to the skilled person can also be used. Two or more of the named coolants can also be used in combinations of compounds.

According to the invention a distributor structure is provided for the feed of coolant. The coolant is supplied separately to the individual fields via this structure. The even distribution of the coolant to the respective fields is achieved by the pressure loss over each cooling field being substantially greater than the pressure loss in the channels of the distributor structure.

According to the invention the individual cooling fields are provided with lines for the inflow and outflow of the coolant. In each individual cooling field there is an inflow and an outflow for the coolant.

According to the invention the supply lines for the coolant are arranged descending in the hydraulic diameter in the direction of flow of the coolant. In contrast the discharge channels are arranged ascending in the hydraulic diameter in the direction of flow of the coolant. Preferably the discharge channels are 2 to 20 times larger than the feed channels. In pressureless use a diameter that is up to 100 times larger can be considered. The hydraulic diameter of the feed channels is preferably 500 µm to 5 mm, most preferably 700 µm to 2 mm. As a basic principle the hydraulic diameter is dependent on the overall length and the number of the distributions of the coolant. The hydraulic diameter grows with the number of distributions.

Therefore, the feed and discharge of the coolant lie within a layer, in other words on an identical plane. The cooling, optionally the evaporation of the coolant takes place in another layer (plane). As a result of this the heat flows between reaction layer (layer 1) and cooling fields are decoupled in a separate layer (2) from the entry temperature of the coolant.

In the carrying-out of the exothermic reactions according to the invention the cooling is achieved by means of the cooling fields. The separate feed of the coolant to the individual cooling fields along the reaction section results in even cooling overall, distributed over the length of the reaction. The heated coolant is discharged again individually from each cooling field. Within the framework of the invention there can preferably be evaporation of the coolant, which is discharged again via the discharge lines. That means that according to the invention an even distribution of fresh coolant and a discharge of steam heated by the exothermic reaction is achieved over the entire reaction section. In this connection the lines for discharge of the steam from the cooling fields are arranged with the maximum gap to the distributor structures carrying the coolant, i.e. between feeds and discharges of the coolant, that is to say between the supply lines that carry the cooler coolant to the cooling fields and the discharge lines that discharge the heated coolant, optionally steam from that of the stacking sequence/reactor. Thus, any conduction of heat between these sections is prevented.

Decoupling of the heat flows between reaction layer (layer 1) and cooling fields in layer 2 from the entry temperature of the coolant guarantees the evening-out of the temperature in the reaction zone, despite a coolant entering well below the boiling temperature, on a surface of the various layers that could be up to several square metres in size. The use of a combination of two layers, one for cooling by means of cooling fields and the other for the distributor structure of the coolant, prevents overheating of the reactor and ensures an even temperature distribution, essentially an isothermal state.

Distributor structure has a parallelised arrangement (parallel arrangement) of a plurality of preferably symmetrical arrangement of the lines for feed and discharge of the coolant. This brings about a flow control in a periodic alternation between counter-flow and cocurrent flow between the feeds and discharges—but in cross-flow in relation to the flow of the reactants—without taking into account the flow in layer of the cooling fields. Also in this way a maximum gap between feeds and discharges of the coolant, as described above, is achieved.

I. REFERENCE SIGNS LIST 1. layer a)
2. layer b)
3. layer c)
4. water
5. steam
6. cooling field
7. feed of coolants
8. unstructured layer
9. discharge of steam
10. supply to various cooling fields
11. longitudinal route of the reaction medium
12. transverse direction of the coolant
13. reaction medium
14. separate charging of coolant

DETAILED DESCRIPTION OF EMBODIMENTS OF THE INVENTION

Figure 1:
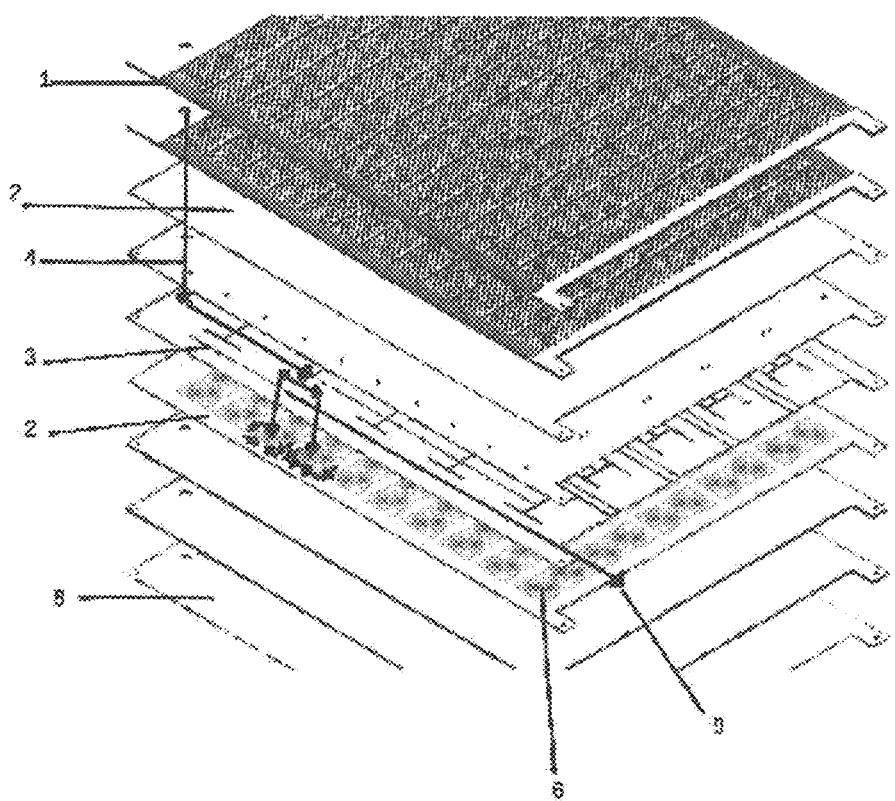
FIG. 1 shows the arrangement of the layers in detail.
Figure 2:
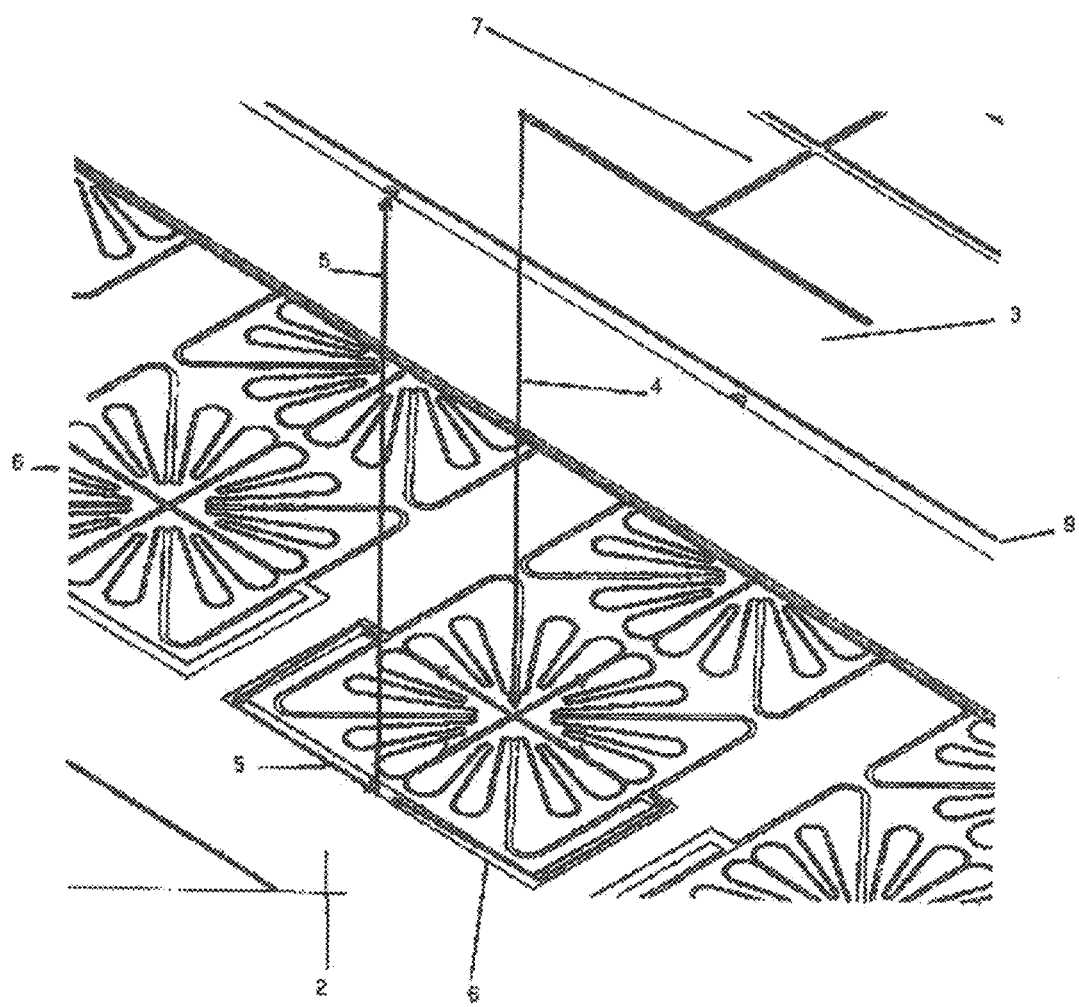
FIG. 2 shows the cooling fields with the feed and discharge lines.
Figure 3:
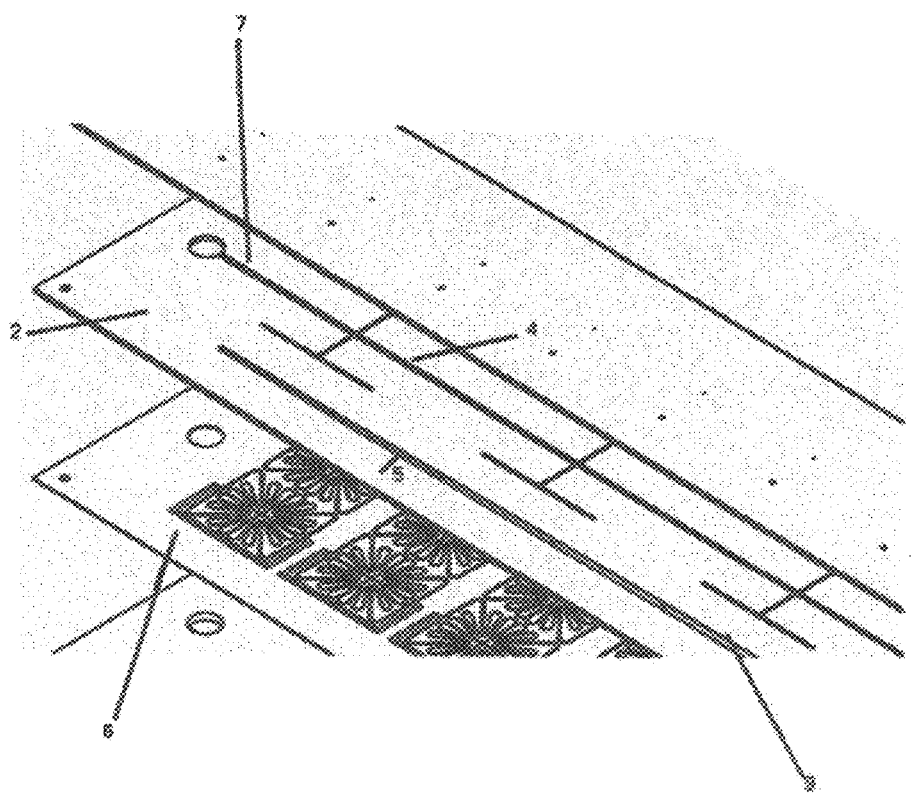
FIG. 3 shows the feed and discharge of the coolant in a three-dimensional representation.
Figure 4:
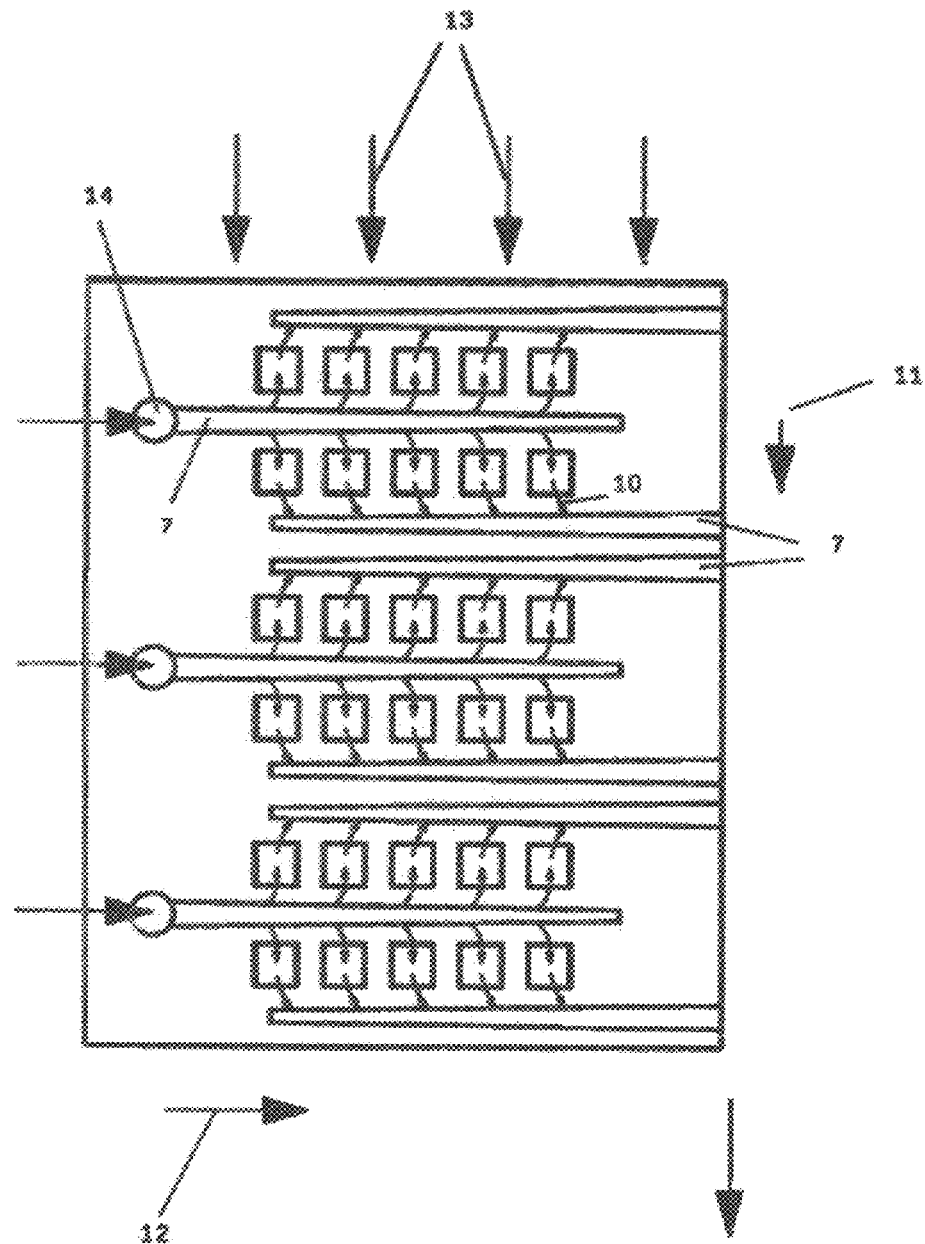
FIG. 4 path of the reaction medium and of the coolant.

From the figures it is possible to see the individual layers including the unstructured layer 8, i.e. the layer a), identified with the number 1, the layer b), labelled with the number 2, and the layer c), labelled with the number 3. Arranged under the layer 1 are the layer 2 and thereunder the distributor structure 3. In other words, between layer 1 and the distributor structure 3 there is the layer 2 with the cooling fields 6. Over and under this stacking sequence there are further stacking sequences, which are arranged as mirror images of the described stacking sequence. Here the coolant is carried via line 7 over line into the cooling fields 6. There the coolant heats up owing to the exothermic reaction that occurs under the influence of the catalysts in layer 1. The heated coolant, normally present as steam, e.g. water 4, is discharged via line 5. The regularly produced steam is discharged finally via line 9. In this way the emergence of a temperature gradient is avoided, which is regularly the consequence with the exothermic reaction, where the coolant is guided along the reaction section. With these constructions according to the prior art the coolant warms up gradually and can in extreme cases reach the reaction temperature.

The coolant, e.g. water 4, can be fed separately into the feed line 7 via the charging point 14. From there the coolant is fed to the various cooling fields 6 via the line 10. In this connection the coolant in line 7 is guided in transverse direction 12 to the direction of the volumetric flow of the reaction medium 13. That means that the reaction medium 13 is guided in longitudinal direction 11 in relation to the coolant, e.g. water 4.

What is claimed is:

1. A microstructure reactor for carrying out an exothermic reaction between two or more reactants, which are passed in the form of fluids over one or more catalysts, wherein the reactor comprises at least one stacking sequence of
   (a) at least one layer comprising one or more catalysts for carrying out at least one exothermic reaction,
   (b) at least one layer divided into two or more cooling fields,
   (c) at least one layer having distributor structures comprising
      lines for distribution of a coolant,
      connections for feeding the coolant to the lines of the distributor structure and for connection to the cooling fields,
      connections for discharging heated coolant from the cooling fields, and
      lines and connections for discharging heated coolant from the stacking sequence.

2. The microstructure reactor of claim 1, wherein the reactor comprises a plurality of stacking sequences.

3. The microstructure reactor of claim 2, wherein the stacking sequences are arranged as mirror images of each other.

4. The microstructure reactor of claim 1, wherein individual layers (a) to (c) are configured in the form of plates or in the form of films.

5. The microstructure reactor of claim 4, wherein layers (a) to (c) have the following thicknesses:
   layer (a): from 0.5 mm to 10 mm,
   layer (b): from 0.1 mm to 5 mm,
   layer (c): from 1 mm to 10 mm.

6. The microstructure reactor of claim 1, wherein one or more layers (a) to (c) comprise structures on their surface.

7. The microstructure reactor of claim 6, wherein the one or more catalysts are filled into the structures.

8. The microstructure reactor of claim 7, wherein the structures are reaction channels or reaction slots, which are filled with particles.

9. The microstructure reactor of claim 8, wherein the reaction channels or reaction slots have a height of from 0.4 mm to 8 mm.

10. The microstructure reactor of claim 1, wherein within the distribution structures lines of coolant-carrying feed are arranged with maximum gap to lines for discharging the coolant from the cooling fields.

11. The microstructure reactor of claim 10, wherein the feed lines for the coolant are descending in hydraulic diameter in a direction of flow of the coolant.

12. The microstructure reactor of claim 11, wherein discharge lines for steam are ascending in hydraulic diameter in a direction of flow of the coolant.

13. The microstructure reactor of claim 1, wherein each cooling field comprises a single feed and discharge of the coolant in the distributor structure.

14. The microstructure reactor of claim 1, wherein the one or more catalysts are cobalt, iron, nickel, rhodium or ruthenium catalysts or contain such elements.

15. The microstructure reactor of claim 1, wherein feed and discharge of coolant in the distributor structure are arranged in cross-flow in relation to a flow of the reactants.

* * * * *